US011187548B2

(12) United States Patent
Lassoued et al.

(10) Patent No.: US 11,187,548 B2
(45) Date of Patent: Nov. 30, 2021

(54) PLANNING VEHICLE COMPUTATIONAL UNIT MIGRATION BASED ON MOBILITY PREDICTION

(71) Applicant: INTERNATIONAL BUSINESS MACHINES CORPORATION, Armonk, NY (US)

(72) Inventors: Yassine Lassoued, Dublin (IE); Julien Monteil, Dublin (IE); Kostas Katrinis, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 401 days.

(21) Appl. No.: 16/267,870

(22) Filed: Feb. 5, 2019

(65) Prior Publication Data

US 2020/0249039 A1 Aug. 6, 2020

(51) Int. Cl.

| G01C 21/34 | (2006.01) |
|---|---|
| G01C 21/20 | (2006.01) |
| G06N 20/00 | (2019.01) |
| G06N 5/04 | (2006.01) |
| G06N 5/02 | (2006.01) |
| G06N 7/00 | (2006.01) |
| G06N 5/00 | (2006.01) |

(52) U.S. Cl.
CPC ......... *G01C 21/3484* (2013.01); *G01C 21/20* (2013.01); *G06N 5/048* (2013.01); *G06N 20/00* (2019.01); *G01C 21/34* (2013.01); *G06N 5/003* (2013.01); *G06N 5/022* (2013.01); *G06N 7/005* (2013.01)

(58) Field of Classification Search
CPC .... G01C 21/3484; G01C 21/20; G01C 21/34; G06N 20/00; G06N 5/048; G06N 5/003; G06N 5/022; G06N 7/005
See application file for complete search history.

(56) References Cited

U.S. PATENT DOCUMENTS

| 9,491,679 | B2 * | 11/2016 | Agardh | ................. | H04W 36/32 |
|---|---|---|---|---|---|
| 2009/0260006 | A1 | 10/2009 | Hotra | | |
| 2015/0003236 | A1 * | 1/2015 | Tsuda | .................... | H04W 48/06 |
| | | | | | 370/229 |
| 2017/0019823 | A1 | 1/2017 | Fujinami | | |
| 2018/0063261 | A1 * | 3/2018 | Moghe | ............. | H04W 36/0083 |
| 2018/0332524 | A1 * | 11/2018 | Rasanen | ........... | H04W 36/0083 |

(Continued)

OTHER PUBLICATIONS

"Addressing Virtual Machine Migration Problems in Cloud Based Vehicular Networks" Oanh Tran Thi Kim et al. Department of Computer Engineering, Kyung Hee University 2015 (3 Pages).

(Continued)

*Primary Examiner* — Jaime M Holliday
(74) *Attorney, Agent, or Firm* — Griffiths & Seaton PLLC (57) ABSTRACT

Various embodiments are provided for planning computational unit (e.g., virtual machine (VM)) migration based on vehicle mobility prediction in a computing environment by a processor. A computational unit handover operation may be dynamically planned associated with a vehicle using one or more predicted routes according to global positioning satellite ("GPS") data, contextual data, historical data, a maximum latency requirement for the vehicle, one or more load balancing requirements for an edge computing server.

20 Claims, 7 Drawing Sheets

(56) References Cited

U.S. PATENT DOCUMENTS

2019/0158606 A1* 5/2019 Guim Bernat .......... H04W 4/40
2020/0068455 A1* 2/2020 Badic .................... H04W 4/029

OTHER PUBLICATIONS

"Virtualizing Vehicular Node Resources: Feasibility study of virtual machine migration" Benjamin Baron et al. Vehicular Communications, 2016, 4, (pp. 39-46).

* cited by examiner

PLANNING VEHICLE COMPUTATIONAL UNIT MIGRATION BASED ON MOBILITY PREDICTION

BACKGROUND OF THE INVENTION

Field of the Invention

The present invention relates in general to computing systems, and more particularly, to various embodiments for planning computational unit migration based on vehicle mobility prediction by a processor.

Description of the Related Art

Vehicles of every kind, size, and energy consumption are prevalent in every aspect of today's society, as people are more mobile today than likely at any time in recorded history, computing systems may include large scale computing called "cloud computing," in which resources may interact and/or be accessed via a communications system, such as a computer network. A popular type of large-scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

SUMMARY OF THE INVENTION

Various embodiments for mobility prediction for computational unit migration (e.g., virtual machine (VM) migration, state migration) in a computing environment by a processor are provided. In one embodiment, by way of example only, a method for planning computational unit (e.g., VM migration, state migration) based on vehicle mobility prediction in a transport network by a processor is provided. A computational unit handover operation (e.g., a VM handover operation, state handover operation) may be dynamically planned associated with a vehicle using one or more predicted routes according to global positioning satellite ("GPS") data, contextual data, historical data, a maximum latency requirement for the vehicle, one or more load balancing requirements for an edge computing server.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As a preliminary matter, networks are evolving towards the virtualization of network functions, and network functions are being designed to execute in computational units (e.g., virtual machines "VMs", states), with such functions commonly being re-allocated to execute in a cloud computing environment. In one aspect, a computational unit may be a VM, a container, a VM state, or a container state. A VM is a software technique based on an entity that runs on a part of a server, possibly with other such entities sharing the same server. It represents the unit of on-demand computation, where each such entity is designated with a pre-defined number of virtual CPUs and memory.

Moreover, the demand for wireless services is increasing rapidly as evident by the tremendous growth in recent years in user equipment ("UE") (e.g., mobile device, internet of things ("IoT") devices, etc.) that allow a user not only to engage in wireless communication, but also to access data, such as e-mails, the internet, etc. Next generation cellular networks utilize more intelligent edge devices such as, for example, an eNodeB, which enjoys greatly enhanced computational and analytics capability in order to serve the mobile users' certain application and service requests at the edge rather than at the core network as in traditional cellular network systems.

Moreover, cloud-based mobile applications have become increasingly popular and one key issue therein is to ensure that services are always delivered with good performance. Current centralized structure of the cloud has led to a generally large geographical separation between the users and the cloud infrastructure. In such a setting, end-to-end communication between user and cloud can involve many network hops resulting in high latency; the ingress bandwidth to the cloud may also suffer from saturation as the cloud infrastructure is accessed on a many-to-one basis. A promising approach for resolving the above problems is to install computing infrastructures at the network edge. Particularly for real-time applications such as instantaneous object recognition and safety assistance in intelligent transportation systems (ITS), service applications have to remain in relatively close proximity to their end users in order to ensure low latency and high bandwidth connectivity. This is captured by the newly emerged concept of mobile edge clouds ("MECs"), as well as similar concepts such as cloudlet, fog computing, follow-me cloud ("FMC"), mobile micro-cloud and small cell cloud. It should be noted that the FMC is a concept according to which services are migrating in unison with the user's movements. An MEC is to move computation closer to users, where small servers or data centers that can host cloud applications are distributed across the network and connected directly to entities (such as cellular base stations) at the network edge. A "server node" (or simply "server") may be defined as a cloud server providing compute and/or storage power for hosting VMs in a follow-me or mobile-edge cloud.

Thus, in general, users of various UE devices (e.g., smartphone, mobile phone, tablet computer, IoT devices, etc.) change their point of attachment in a cellular network (by movement or migration away from a cell tower of a cell region) and start getting served by a new edge-of-network application aware proxy server or "EdgeApp" server. A state in an edge application proxy/server, associated with the UE, may need to be migrated from an old EdgeApp server at the source node to a new EdgeApp server at a destination node.

In the MEC or FEC, a set of server nodes may be responsible for a "small" geographic area each, allowing local processing of UE data with low latency. A challenge arises when the UE, which is connected to a cloud computing environment/network, is mobile. As the UE is moving, the associated VM, which is processing the UE data in the cloud or the state associated with the UE, needs to be dynamically handed over from one server to another. The objective is to allow the moving UE to be connected to an appropriate node in its geographic proximity, guaranteeing the latency level required by the application. Low latency is particularly relevant for traffic safety applications in the context of connected vehicles.

Large volumes of data collected by a moving vehicle (e.g., video data) are processed on a VM and then be fed to a driver assistance system of a vehicle, for example, requiring ultra-low latency (milliseconds or tens of milliseconds). Current approaches attempt optimization of dynamic service migration in MEC and FEC by dealing with the problem in its general form without any assumption on the predictability of the trajectories of the moving devices. However, in some areas, such as the automotive industry, the mobile devices provide a predictability property. That is, vehicle drivers, for example, are very likely to follow repetitive patterns as to their destinations and routes. Accordingly, a need exist for making use of the mobility predictability property for planning the migration of virtual machines in a MEC or FEC cloud.

Accordingly, various embodiments provide a mobility-prediction based operations for planning vehicle computational unit migration (e.g., VM migration, state migration) in FEC cloud computing environment. That is, the present invention provides for planning the migration of virtual machines associated with moving vehicles in a follow-me (mobile-edge) cloud.

In one aspect, the present invention makes use of the predictability of vehicle destinations and routes to plan in real-time, but in advance, the migration of their computational unit (e.g., VM migration, state migration) in an optimal way. One or more destinations and most likely routes (e.g., a defined percentage value, routes predicted greater than a defined threshold, or a percentage value greater than other routes) of one or more connected vehicles in real-time using historical data. An optimized plan may be generated for migrating each vehicles' computational unit migration (e.g., VM migration) according to the following criteria: 1) minimization of migration cost for each vehicle while assuring sufficiently low latency throughout the journey and 2) maintaining the loads balanced across the infrastructure nodes (e.g., MEC application servers).

In one aspect, a computational unit handover operation may be dynamically planned associated with a vehicle using one or more predicted routes according to global positioning satellite ("GPS") data, contextual data, historical data, a maximum latency requirement for the vehicle, and/or one or more load balancing requirements for an edge computing server.

In one aspect, the mechanisms of the present invention cognitively learn parameters or "contextual factors" via one or more machine learning operations. Furthermore, contextual factors may be in a specific context related to the transport network. The contextual factors may also include, for example, traffic conditions, traffic predictions, loss time of one or more users of the transport network as a result of the one or more events, a total time of driving by one or more users, time of data/month/year, traffic data, weather data, road conditions, travel itinerary of the one or more users, weather data, road conditions, route trajectories in relation to a vehicle, or a combination thereof. Thus, for example, the contextual factors may be used to assist in more efficiently, precisely, and accurately predict a route when used in conjunction with observed vehicle GPS traces.

The so-called "route" may be very subjective and context dependent. A route may simply be, in a broadest possible meaning, the entire/whole travel experience from a point A to a point B. For example, a route may encompass an entire travel experience. In a more limiting context, a route may include one or more actions or movements of traveling from one location to another location. The route may also include one or more acts, events, decisions, or travel related operations relating to one or more acts of moving from one location to one or more alternative locations. A route may include each decision, experience, action, and/or movement within and without a vehicle. A route may include one or more routes and destinations. A route may also include one or more actions, movements, stops (temporary or permanent), travel information, reservations, transportation options, modes of travel, and/or one or more operations relating to navigation systems, entertainment systems, and/or telecommunication systems. In one aspect, a route may be a user defined location-to-location (point-to-point) journey and/or may be use of single or multi-modal travel planning. Also, the route may be a single or multi-modal travel planning learned via cognitive reasoning and/or artificial intelligence.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more problems, domains, events, operations, or processes. Thus, the cognitive model may, over time, develop semantic labels to apply to observed behavior, domains, problems, and use a knowledge domain or ontology to store the learned observed behavior, problems, and domain. In one embodiment, the system provides for progressive levels of complexity in what may be learned from the one or more dialogs, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identifying problems, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
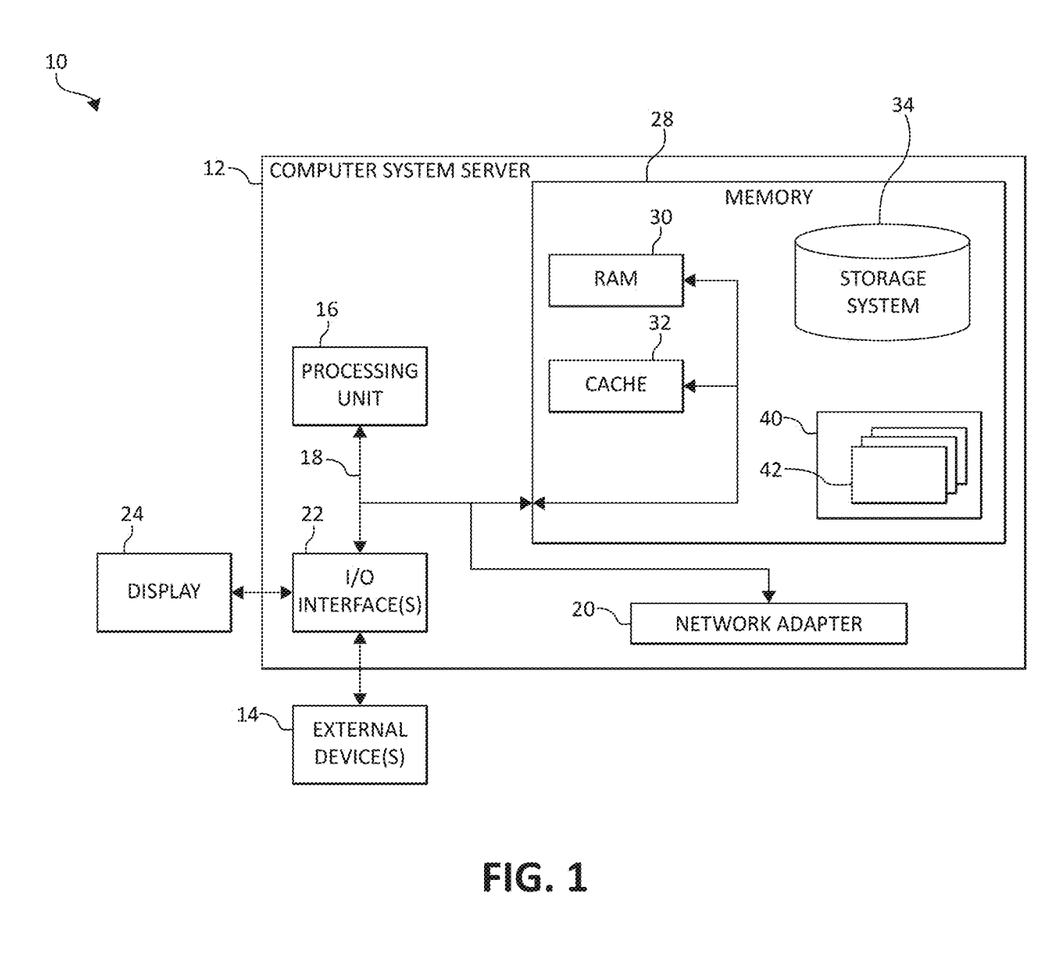
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
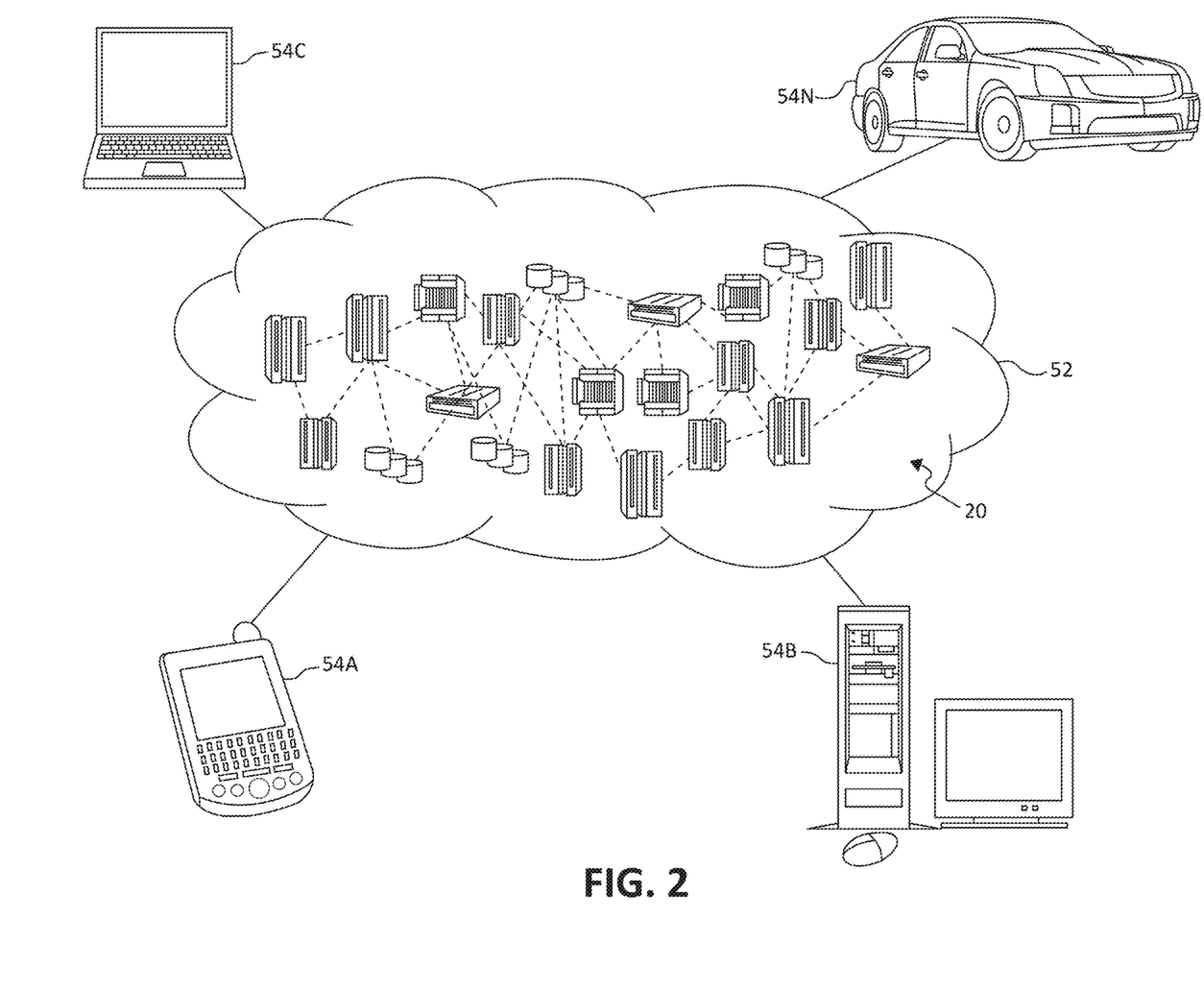
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
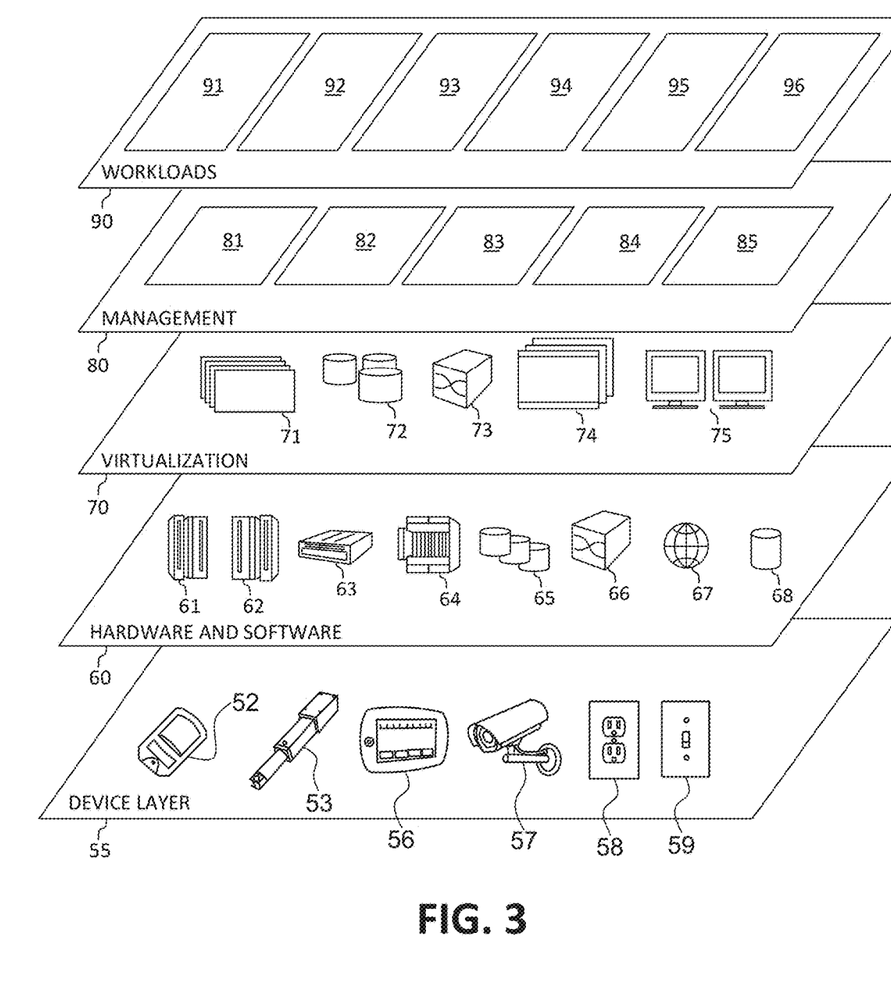
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for planning computational unit migration (e.g., VM migration, state migration) based on vehicle mobility prediction. In addition, various workloads and functions 96 for planning computational unit migration (e.g., VM migration, state migration) based on vehicle mobility prediction may include such operations as data analysis (including data collection and processing from various vehicular or environmental sensors), collaborative data analysis, and predictive data analytics functions. One of ordinary skill in the art will appreciate that the workloads and functions 96 for planning computational unit migration (e.g., VM migration, state migration) based on vehicle mobility prediction may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for a cognitive system to provided mobility prediction for computational unit migration (e.g., VM migration, state migration) in a computing environment by a processor are provided. A computational unit handover operation (e.g., VM or state handover operation), associated with a vehicle, may be dynamically planned using one or more predicted routes according to GPS data, contextual data, historical data, a maximum latency requirement for the vehicle, one or more load balancing requirements for an edge computing server.

The cognitive system may process as input data: 1) real-time GPS data of at least one vehicle, 2) historical data for at least one vehicle with GPS traces and (optionally) migration actions from previous trips, 3) contextual data such as, for example, the time of the day and day of the week, 4) a maximum latency requirement for each vehicle, and/or 5) load balancing requirements for each FEC/MEC server.

Upon processing the input data, the cognitive system may generate as output one or more optimized plans of computational unit handover operation (e.g., VM handover operation, state handover operation) for each vehicle, including the assigned servers and timing. The cognitive system may infer the most probable routes for each vehicle from the real time traces and historical data. The cognitive system may plan or determine one or more optimal computational unit handover operation schedules (e.g., VM handover schedules, state handover schedules) for the vehicles along their predicted routes while achieving a minimum migration cost for each vehicle while assuring sufficiently low latency and smooth transition throughout the journey, and balancing loads across the FEC/MEC servers.

That is, the cognitive system may infer the most probable routes (e.g., k routes having a highest probability/percentage which may be above a defined threshold, where k is a positive integer or defined value) for each vehicle. The cognitive system may plan one or more optimal handover schedule options for a vehicle according to the predicted route. A load balancing operation may be performed for selection/refinement of optimum handover schedules to balance the load across the FEC/MEC servers.

The vehicle route prediction may rely on one or more machine learning operations taking as input real-time GPS traces, context data (e.g., time of the day, day of the week), and machine learning models learned from vehicle historical trip data. An updated/new computational unit handover schedule (e.g., VM handover schedule) may be recomputed/updated upon the prediction of the vehicle route having a confidence score greater than a defined threshold. Also, an updated/new computational unit handover schedule (e.g., VM handover schedule, state handover schedule) may be recomputed/updated computation upon the detection of a different trajectory by the vehicles as the most probably route. The cognitive system outputs one or more (e.g., m) potential handover schedules for each of the k predicted routes, including the server assignment and timing. Historical computational unit handover (e.g., VM handover, state handover) solutions may be used as one or more potential optimized solutions to determine/check in the context of the current trip. The cognitive system may select, in real time for example, one or more optimal/best computational unit handover schedules (e.g., optimized VM or state handover schedules) for the vehicles in such a way that the optimal/best computational unit handover schedule (e.g., VM or state handover schedule) maintains the load balanced across the FEC/MEC servers.

Figure 4:
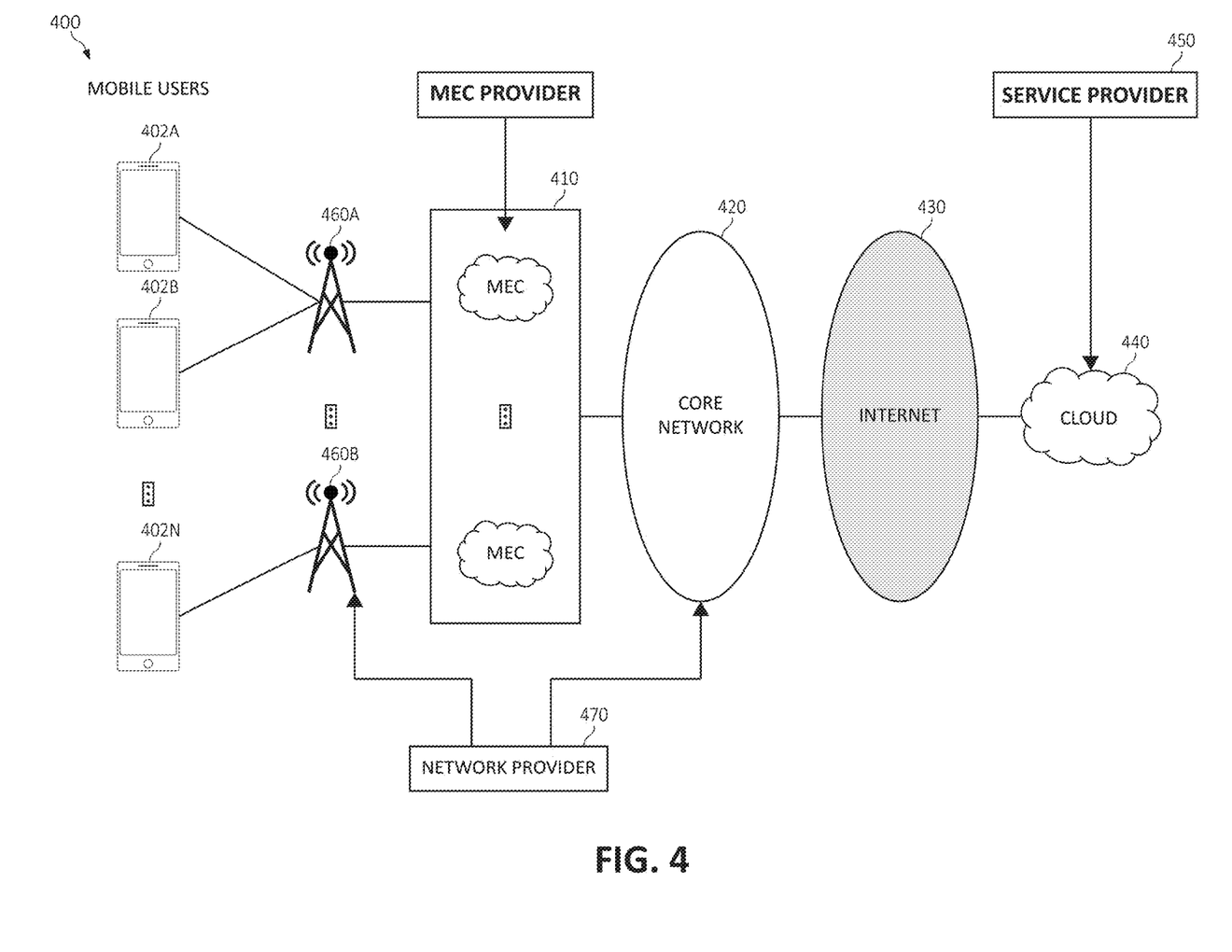
FIG. 4 is a diagram illustrating an exemplary wireless network in which the present techniques may be implemented according to an embodiment of the present invention.

Turning now to FIG. 4, a diagram is depicted illustrating an exemplary wireless network 400 such as, for example, a mobile edge clouds (MEC) computing environment according to an example of the present technology. As will be seen, many of the functional blocks may also be considered "modules" or "components" of functionality, in the same descriptive sense as has been previously described in FIGS. 1-3. With the foregoing in mind, the module/component blocks of wireless network 400 may also be incorporated into various hardware and software components of a system.

The wireless network 400 may include the one or more UE's 402A-N (e.g., an IoT device, vehicle, smart phone, computer, etc.), one or more edge devices 460A-B (e.g., base stations/Evolved Universal Terrestrial Radio Access Network (E-UTRAN) Node Bs (also commonly denoted as evolved Node Bs, enhanced Node Bs, eNodeBs, or eNBs)), a core network 420, a service provider 450, a cloud computing environment 440, and internet 430. The core network 420 and the one or more edge devices 460A-B may be a network provider. The MEC 410 (e.g., MEC provider) may be small clouds that offer a limited set of cloud services via a service provider 450 from the one or more edge devices 460A-B of the mobile network. The core network 420 and the one or more edge devices 460A-B may be a network provider. That is, the wireless network 400 may include the network provider 470 (e.g., the core network 420 and the one or more edge devices 460A-B), the MEC provider 410, and the service provider 450.

When one or more of the UE 402A-402N (e.g., edge users/mobile user/vehicle) request arrives at the edge network (e.g., network provider 470), one or more of the one or more edge devices 460A-B may first check whether the requested application or service is available locally, or whether it can be launched locally using remaining CPU or memory resources. An MEC server 410 may, for example, refer to the service provider 450 that has the ability to run IT services/services at the edge of mobile Radio Access Network (RAN) based on the concepts of cloud computing, which may be provided by the internet 430 and the cloud computing environment 440 (e.g., private cloud). The term "edge" in this context may for example mean the one or more edge devices 460A-B and servers within the RAN (e.g., at "aggregation points"). The presence of the MEC 410 (e.g., MEC server) at the edge of the one or more edge devices 460A-B may allow exposure to real-time radio and network information (such as subscriber location, cell load, etc.) that can be leveraged by applications and services of service provider 450 to offer context-related services to one or more one or more of the UE 402A-402N (e.g., edge users/mobile user/vehicle). Thus, the MEC 410 enables running applications and performing related processing tasks closer to the one or more of the UE 402A-402N by the MEC 410 (e.g., MEC application server) being deployed at the one or more edge devices 460A-B that is part of a cellular/wireless communication.

Figure 5:
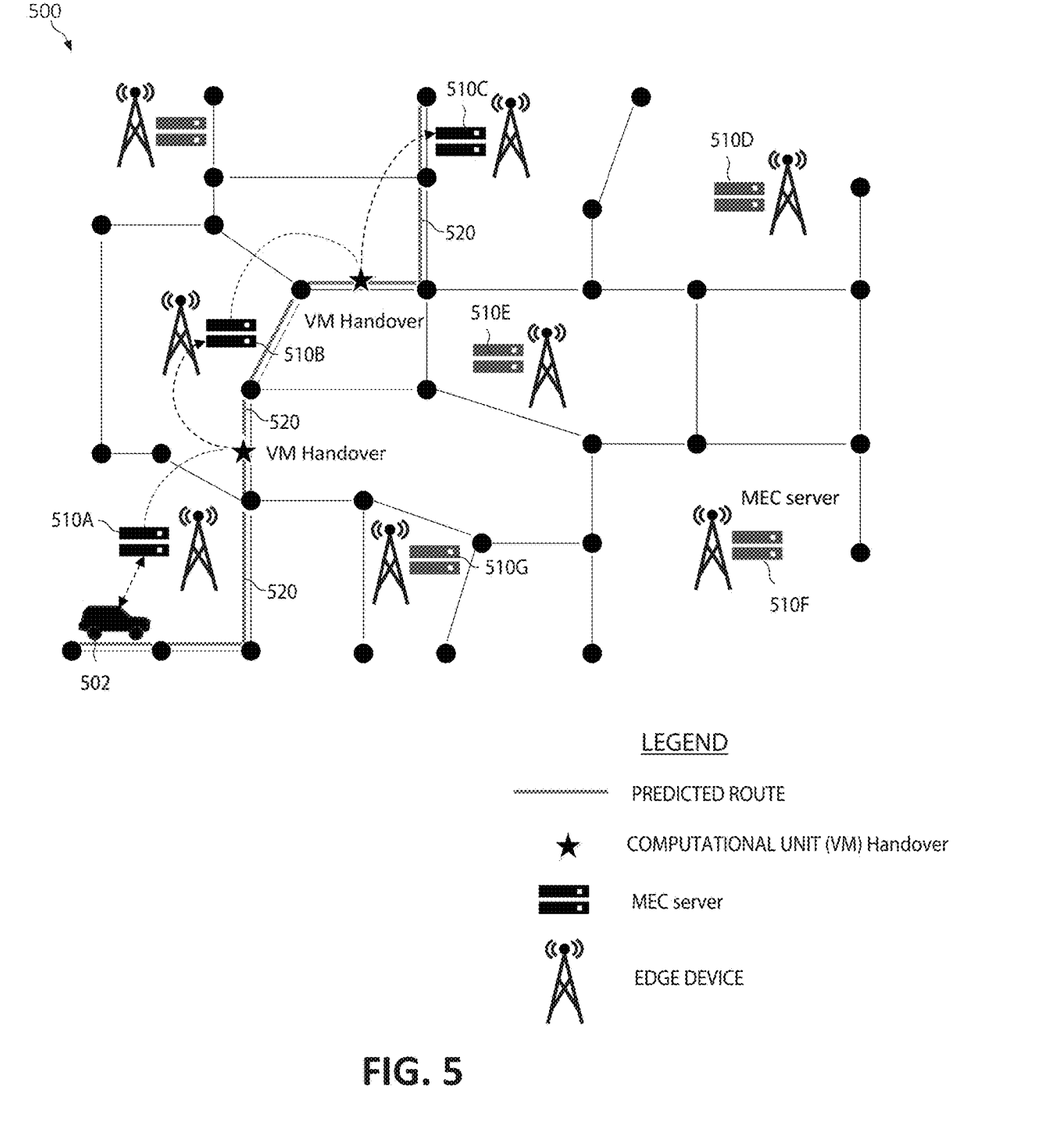
FIG. 5 is a diagram illustrating the migration plan of a computational unit (e.g., VM or state) according to the predicted vehicle route.

Turning to FIG. 5, a diagram depicts a map of cognitive planning computational unit migration (e.g., VM migration) based on vehicle mobility prediction in an Internet of Things (IoT) computing network. In one aspect, one or more of the components, modules, services, applications, and/or functions described in FIGS. 1-4 may be used in FIG. 5. For example, computer system/server 12 of FIG. 1 may be included in FIG. 5 and may be connected to other computing nodes (such as computer systems of vehicles or non-vehicle systems such as traffic cameras, cloud computing networks, GPS devices, smartphones, etc.) over a distributed computing network, where additional data collection, processing, analytics, and other functionality may be realized.

As illustrated, map 500 illustrates planning computational unit migration (e.g., VM migration, state migration) based on vehicle mobility prediction and inferring/predicting a travel route of a user (e.g., vehicle) in a transport network. To maintain the benefits of running services close to the vehicle 502, when a vehicle 502 (e.g., a mobile user or one or more of the UE 402A-402N of FIG. 4) moves away from its original location, its service may need to be migrated to a new MEC server such as, for example, one of the MEC servers 510A-G along one or more routes in map 500 that is near the current vehicle 502 location. For example, vehicle 502 may be connected to a first MEC such as, for example, MEC 510A. The vehicle 502 is continuously submitting data to an associated computational unit (e.g., VM) in the MEC 410A for real-time processing, requiring low latency. As the vehicle 502 is moving, its associated computational unit (e.g., VM, state) needs to be migrated ("handed over") to an MEC server in its geographic proximity to keep the latency low. By inferring and/or predicting the route (e.g., "predicted route") of the vehicle 502 from using historical data of the vehicle 502, taking into consideration the context of the current trip, the migration of the vehicle's 502 computational unit (e.g., VM) may be planned and optimized in advance and in a smooth way to MEC 510B, then later on to MEC 510C.

Accordingly, a computational unit handover operation (e.g., VM or state handover operation), associated with the vehicle 502, may be planned using a predicted route 520 according to global positioning satellite ("GPS") data, contextual data, historical data, a maximum latency requirement for the vehicle, and/or one or more load balancing requirements for one or more of the MECs 510A-G (e.g., edge computing servers). The predicted route 520 may be predicted and inferred of the vehicle 502 according to the historical data, contextual data, or a combination thereof using one or more machine learning operations. Thus, one or more computational unit handover schedules (e.g., VM handover schedules) for the vehicle 502 at one or more locations (e.g., at one or more of the MECs 510A-G) of the predicted route 520 may be determined according to a confidence score of the predicted route 520, upon detecting a trajectory of an alternative route (e.g., a deviation from the predicted route 520), and/or one or more historical computational unit handover schedules (e.g., historical VM or state handover schedules). For example, a computational unit handover operation (e.g., VM or state handover operation) may be scheduled on the predicted route 520 for the computational unit migration to occur from MEC 510A to 510B. A second computational unit handover operation (e.g., VM or state handover operation) may be scheduled on the predicted route 520 for the computational unit/VM migration to occur from MEC 510B to 510C.

In one aspect, the present invention provides for planning computational unit migration (e.g., VM migration, state migration) based on vehicle mobility prediction and inferring/predicting a travel route of a user (e.g., vehicle), the present invention may provide a layered Hidden Markov Model (HMM) to predict the next MEC areas. The input of the first layer may be map-matched GPS coordinates and the output may be the inferred/predicted routes. The predicted routes may be used as observations to a second HMM, which predicts the sequence of traversed MEC areas.

Second, in one embodiment for example, the policy $\pi$ that computes the used MEC servers $h(k)$, associated with the state $l(k)$, which is the current road link, may be optimized. A new observation time step $k+1$ indicates ("means") that the vehicle moves to a different road link $l(k+1) \neq l(k)$.

The states may be defined as $s(k)=[l(k),h(k)]$ at each time step k. The value of any policy is $V_\pi(s(0))=E[\Sigma_k^H R(s(k))] |\pi;s(0)]$, where H is the time step at destination, and $R(s(k))= c_1(l(k),s(k))+c_2(s(k-1)s(k))$ where $c_1$ and $c_2$ are latency and migration cost function.

The goal is to find the policy $\pi$ that maximizes $$\max_\pi V_\pi(s(0)).$$

Maximizing a finite horizon policy may be performed assuming a Markov property and via dynamic programming approach such as, for example, value iteration or policy iteration operations.

As used herein, the predicted likelihood of the routes (e.g., road links and MECs) may be used to restrict the search space (e.g., restricting the search space for identifying the next computational unit migration/handover). At each time step k, the migration policies may be determined/computed for the most likely routes (as compared to the other available routes) selected/defined by a number (e.g. 3 most likely routes) or by threshold (e.g., greater than a defined threshold such as, for example, probability>0.1). Each predicted route may have a predicted average entry/start and exit/stop time, which can be calculated from context (e.g., day of the week, time of the day, traffic conditions, etc.). The computational unit migration may be restricted to start only when a migration time is less than the predicted entry time that is subtracted from the current time (e.g., migration time<(predicted entry time−current time). The finite horizon policy may be re-evaluated in real-time and scheduled computational unit migrations (e.g., VM migrations) can be stopped if MEC routes become less likely. Thus, the present invention is robust to uncertainty and reactive to a current trip of the vehicle.

Figure 6:
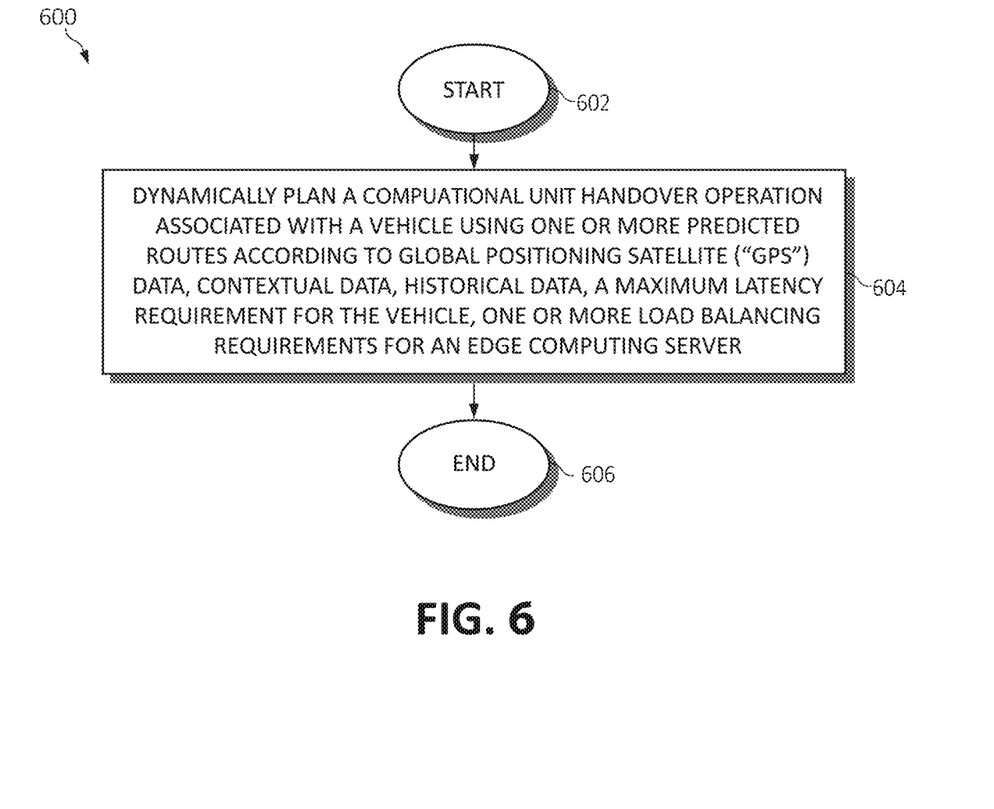
FIG. 6 is a block/flow diagram depicting planning the migration of a computational unit (e.g., VM or state) according to the predicted vehicle route.

Turning now to FIG. 6, a method 600 for planning computational unit migration (e.g., VM migration) based on vehicle mobility prediction in a computing environment by a processor is depicted, in which various aspects of the illustrated embodiments may be implemented. The functionality 600 may start in block 602.

A computational unit handover operation (e.g., VM or state handover operation), associated with a vehicle, may be dynamically planned using one or more predicted routes according to global positioning satellite ("GPS") data, contextual data, historical data, a maximum latency requirement for the vehicle, one or more load balancing requirements for an edge computing server, as in block 604. The functionality 600 may end, as in block 606.

Figure 7:
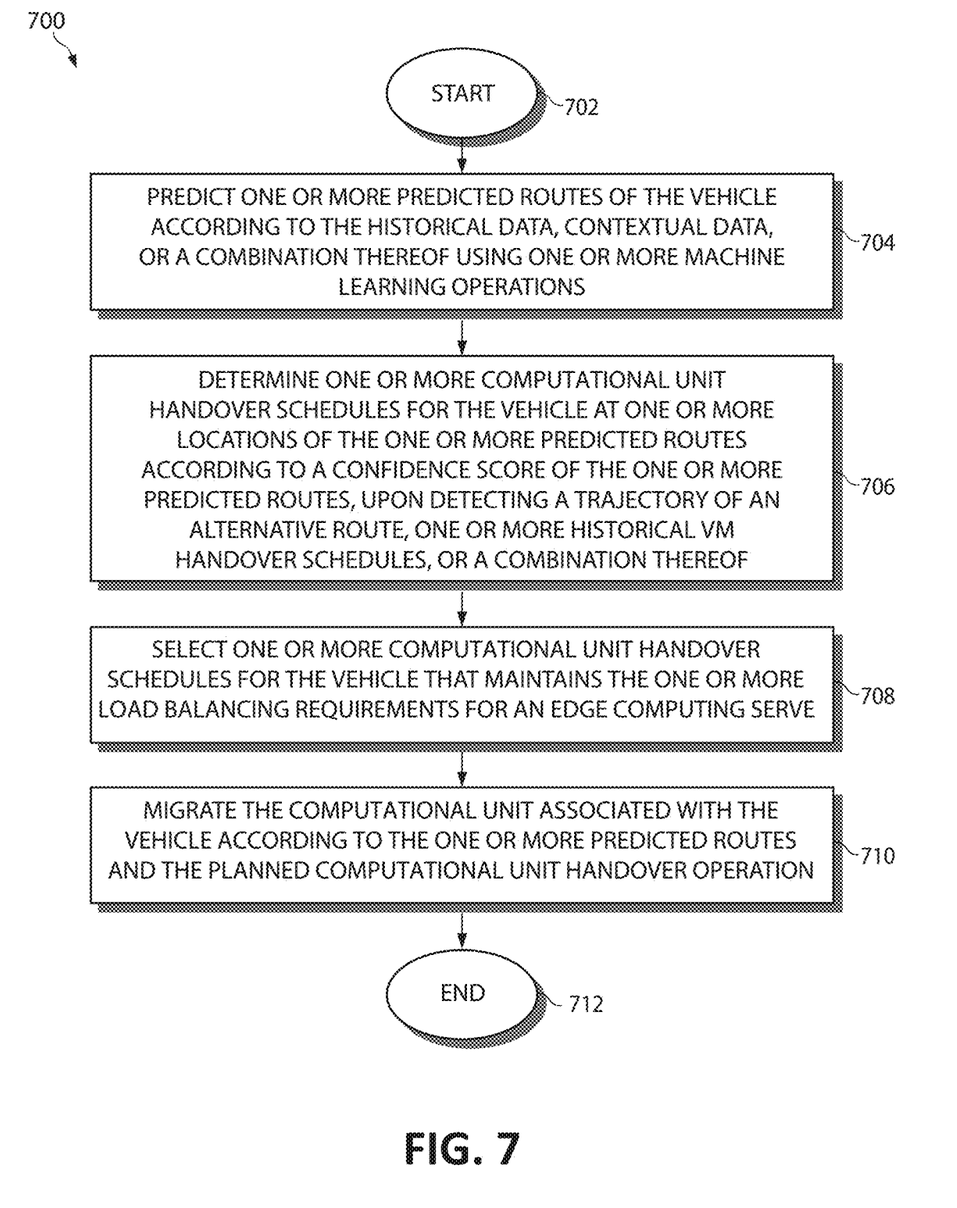
FIG. 7 is a flowchart diagram of an exemplary method for planning the migration of a computational unit (e.g., VM or state) by a processor according to the predicted vehicle route, in which various aspects of the present invention may be realized.

Turning now to FIG. 7, a method 700 for planning computational unit migration (e.g., VM migration) based on vehicle mobility prediction in a computing environment by a processor is depicted, in which various aspects of the illustrated embodiments may be implemented. The functionality 700 may start in block 702.

One or more predicted routes of the vehicle according to the historical data, contextual data, or a combination thereof using one or more machine learning operations, as in block 704. One or more computational unit handover schedules (e.g., VM or state handover schedules) may be determined for the vehicle at one or more locations of the one or more predicted routes according to a confidence score of the one or more predicted routes, upon detecting a trajectory of an alternative route, one or more historical computational unit handover schedules (e.g., VM or state handover schedules), or a combination thereof, as in block 706. One or more of the computational unit handover schedules (e.g., VM handover schedules) may be selected for the vehicle that maintains the one or more load balancing requirements for an edge computing server, as in block 708. The computational unit (e.g., VM, state) associated with the vehicle may be migrated according to the one or more predicted routes and the planned VM handover operation, as in block 710. The functionality 700 may end, as in block 712.

In one aspect, in conjunction with and/or as part of at least one block of FIGS. 6-7, the operations of 600 and/or 700 may include each of the following. The operations of 600 and/or 700 may infer the one or more predicted routes of the vehicle according to the historical data, contextual data, or a combination thereof using one or more machine learning operations, detect and learn the one or more contextual factors. The contextual data include a transport network, location of one or more MEC devices/base stations, temporal context (time of the day, day of the week, month, season, etc.), traffic conditions, traffic predictions, traffic data, weather data, road conditions, or a combination thereof. The traffic conditions may also include traffic congestion at one or more locations in the transport network, an accident, a temporary road closure, a temporary event causing a negative impact on traffic flow in the transport network, or combination thereof. The operations of 600 and/or 700 may detect and learn the one or more vehicle-specific factors. The vehicle-specific factors include a tolerated loss time of one or more users of the transport network as a function of the contextual factors, a total time of driving by one or more users, predicted routes associated with the one or more users of the transport network, current routes associated with the one or more users of the transport network, travel itinerary of the one or more users, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for mobility prediction for computational unit migration in a computing environment comprising:
    dynamically planning a computational unit handover operation associated with a vehicle using one or more predicted routes according to global positioning satellite ("GPS") data, contextual data, historical data, a maximum latency requirement for the vehicle, and one or more load balancing requirements for an edge computing server, wherein the computational unit handover operation is planned for a plurality of nodes predicted to handle the computational handover operation for an entirety of the one or more predicted routes as the one or more predicted routes are associated with an upcoming or future vehicle trip.

2. The method of claim 1, further including predicting the one or more predicted routes of the vehicle according to the historical data, contextual data, or a combination thereof using one or more machine learning operations.

3. The method of claim 1, further including determining one or more computational unit handover schedules for the vehicle at one or more locations of the one or more predicted routes according to a confidence score of the one or more predicted routes.

4. The method of claim 1, further including determining one or more computational unit handover schedules for the vehicle upon detecting a trajectory of an alternative route.

5. The method of claim 1, further including determining one or more computational unit handover schedules for the vehicle according to one or more historical computational unit handover schedules.

6. The method of claim 1, further including selecting one or more computational unit handover schedules for the vehicle that maintains the one or more load balancing requirements for the edge computing server.

7. The method of claim 1, further including migrating the computational unit associated with the vehicle according to the one or more predicted routes and the planned computational unit handover operation.

8. A system for mobility prediction for computational unit migration in a computing environment, comprising:
    one or more computers with executable instructions that when executed cause the system to:
        dynamically plan a computational unit handover operation associated with a vehicle using one or more predicted routes according to global positioning satellite ("GPS") data, contextual data, historical data, a maximum latency requirement for the vehicle, and one or more load balancing requirements for an edge computing server, wherein the computational unit handover operation is planned for a plurality of nodes predicted to handle the computational handover operation for an entirety of the one or more predicted routes as the one or more predicted routes are associated with an upcoming or future vehicle trip.

9. The system of claim 8, wherein the executable instructions further infer the one or more predicted routes of the vehicle according to the historical data, contextual data, or a combination thereof using one or more machine learning operations.

10. The system of claim 8, wherein the executable instructions further determine one or more computational unit handover schedules for the vehicle at one or more locations of the one or more predicted routes according to a confidence score of the one or more predicted routes.

11. The system of claim 8, wherein the executable instructions further determine one or more computational unit handover schedules for the vehicle upon detecting a trajectory of an alternative route.

12. The system of claim 8, wherein the executable instructions further determine one or more computational unit handover schedules for the vehicle according to one or more historical computational unit handover schedules.

13. The system of claim 8, wherein the executable instructions further select one or more computational unit handover schedules for the vehicle that maintains the one or more load balancing requirements for the edge computing server.

14. The system of claim 8, wherein the executable instructions further migrate the computational unit associated with the vehicle according to the one or more predicted routes and the planned computational unit handover operation.

15. A computer program product for mobility prediction for virtual machine (computational unit) migration in a computing environment by a processor, the computer program product comprising a non-transitory computer-readable storage medium having computer-readable program code portions stored therein, the computer-readable program code portions comprising:
    an executable portion that dynamically plans a computational unit handover operation associated with a vehicle using one or more predicted routes according to global positioning satellite ("GPS") data, contextual data, historical data, a maximum latency requirement for the vehicle, and one or more load balancing requirements for an edge computing server, wherein the computational unit handover operation is planned for a plurality of nodes predicted to handle the computational handover operation for an entirety of the one or more predicted routes as the one or more predicted routes are associated with an upcoming or future vehicle trip.

16. The computer program product of claim 15, further including an executable portion that infers the one or more predicted routes of the vehicle according to the historical data, contextual data, or a combination thereof using one or more machine learning operations.

17. The computer program product of claim 15, further including an executable portion that determines one or more computational unit handover schedules for the vehicle at one or more locations of the one or more predicted routes according to a confidence score of the one or more predicted routes.

18. The computer program product of claim 15, further including an executable portion that:
- determine one or more computational unit handover schedules for the vehicle upon detecting a trajectory of an alternative route; or
- determines one or more computational unit handover schedules for the vehicle according to one or more historical computational unit handover schedules.

19. The computer program product of claim 15, further including an executable portion that selects one or more computational unit handover schedules for the vehicle that maintains the one or more load balancing requirements for the edge computing server.

20. The computer program product of claim 15, further including an executable portion that migrates the computational unit associated with the vehicle according to the one or more predicted routes and the planned computational unit handover operation.

\* \* \* \* \*